March 26, 1946.   E. H. LAND   2,397,149
PLASTIC SHEET AND METHOD OF MANUFACTURE
Filed May 22, 1942
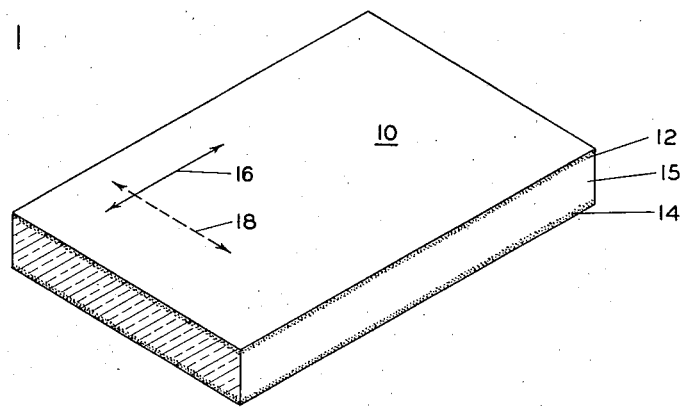
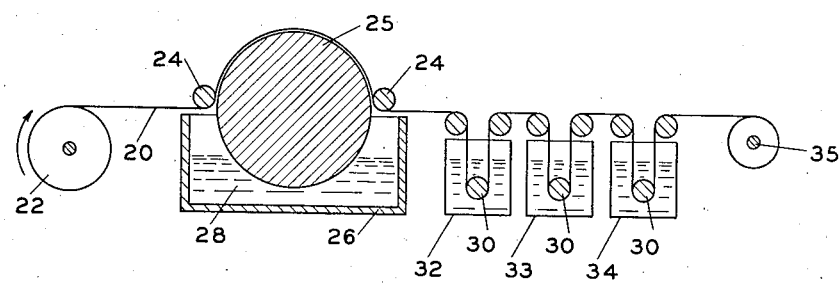
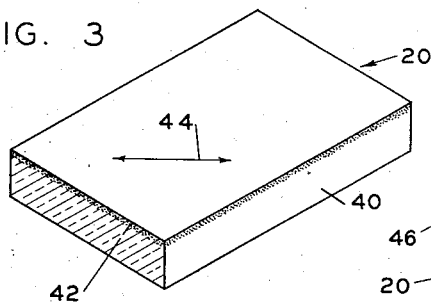
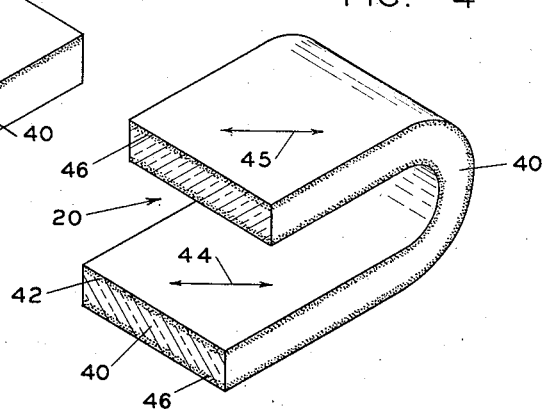
Edwin H. Land
INVENTOR.
BY Donald L. Brown
Attorney Patented Mar. 26, 1946

2,397,149

UNITED STATES PATENT OFFICE 2,397,149

PLASTIC SHEET AND METHOD OF MANUFACTURE

Edwin H. Land, Cambridge, Mass., assignor to Polaroid Corporation, Cambridge, Mass., a corporation of Delaware Application May 22, 1942, Serial No. 444,141

28 Claims. (Cl. 88—65)

This invention relates to a new and useful plastic sheet or film particularly adapted for use in the production of stereoscopic images comprising light-polarizing material, and to the method of making said sheet or film.

An object of the present invention is to provide a unitary sheet or film of transparent plastic material whose surfaces comprise molecularly oriented polyvinyl alcohol, and particularly a sheet having the direction of molecular orientation on one surface substantially at right angles to the direction of molecular orientation on its other surface.

Another object is to provide a unitary sheet or film of the above type which will comprise on its surfaces molecularly oriented polyvinyl alcohol, but the body of which will comprise a derivative of polyvinyl alcohol.

A further object of the invention is to provide a sheet of the above type in which the directions of molecular orientation on the two surfaces bear predetermined angular relationships to the sides of the sheet or film.

A still further object is to provide a method or process for making sheets or films having the above described characteristics, and particularly to provide such a process wherein a sheet or film of a derivative of polyvinyl alcohol has the surfaces thereof regenerated or converted to polyvinyl alcohol, and wherein the molecules in the polyvinyl alcohol so formed are predeterminedly oriented.

Other objects and advantages will in part appear and in part be pointed out in the course of the following detailed description of one or more embodiments of the invention, which are given as non-limiting examples, in connection with the accompanying drawing, in which:

Figure 1 is a diagrammatic view in perspective showing a plastic sheet constituting an embodiment of the invention;

Fig. 2 shows diagrammatically apparatus suitable for use in the practice of the process of the invention;

Fig. 3 is a view similar to Fig. 1 showing another embodiment of the invention; and Fig. 4 is a view similar to Figs. 1 and 3 showing still another embodiment of the invention.

In the production of superimposed, stereoscopic images comprising light-polarizing material, the two images are so formed that their respective polarizing axes are substantially at right angles to each other. For example, each image of the stereoscopic pair may be formed by applying a dichroic dye or stain to the surface of a suitable, molecularly oriented sheet or film of transparent, organic plastic material, preferably polyvinyl alcohol, and at some stage of the process the two image-bearing surfaces may be superimposed in such manner that their respective directions of molecular orientation are substantially at right angles to each other. Each image may be formed on a separate, molecularly oriented sheet, and the latter may then be superimposed with their directions of molecular orientation in the proper relation. Preferred results are obtained, however, if the two surfaces of the same plastic sheet are first molecularly oriented substantially at right angles to each other and the images are then superimposed by printing one on one surface of the sheet and the other on the other surface. The present invention is concerned particularly with the provision of sheets or films of this type.

In accordance with the present invention, it has been discovered that an improved sheet of the desired properties may be prepared from derivatives of polyvinyl alcohol by regenerating or converting the surface layers of a sheet or film thereof to polyvinyl alcohol, and by suitably stretching or otherwise treating said sheet at appropriate stages of the process to orient the molecules in said surface layers.

The product of the present invention may accordingly be described generally as comprising a transparent sheet or film, the major or central portion or layer of which comprises a derivative of polyvinyl alcohol, but the surface layers of which comprise molecularly oriented polyvinyl alcohol, with the directions of molecular orientation of the two surfaces substantially at right angles to each other.

An illustrative example of such a product is shown diagrammatically in Fig. 1, wherein sheet 10 represents a sheet or film composed largely of a derivative of polyvinyl alcohol such for example as polyvinyl acetal, surface layers 12 and 14 of which have been regenerated or converted to polyvinyl alcohol, as indicated by the stippling, and molecularly oriented, but the inner layer or portion 15 of which still comprises polyvinyl acetal. Arrows 16 and 18 represent the directions of molecular orientation of surface layers 12 and 14, respectively. It should be noted, however, that although said arrows are indicated as being parallel and perpendicular to the edges of sheet 10, the invention is in no way limited to this arrangement. On the contrary, as will be pointed out hereinafter, in the preferred embodiment of the invention, the directions of molecular orientation of the surfaces will be at angles of 45° to the edges of the sheet, as shown, for example, in Fig. 4.

The process of the present invention is applicable to substantially all transparent organic plastics which may be made from polyvinyl alcohol and hence which may be converted or regenerated to polyvinyl alcohol while in sheet form. For the purposes of this description and the claims herein, the materials falling within this definition will be termed "derivatives of polyvinyl alcohol." The preferred materials for the purpose of the invention are from the class consisting of the organic acid esters of polyvinyl alcohol, such for example as polyvinyl acetate, polyvinyl formate and the copolymer of polyvinyl acetate and polyvinyl chloride, and the cyclic ethers of polyvinyl alcohol, such particularly as the acetals and ketals of polyvinyl alcohol. The term "acetals and ketals of polyvinyl alcohol" is to be understood as generic to the classes of resins formed from polyvinyl acetate by the successive or combined steps of hydrolysis and condensation with aldehydes or ketones, respectively. One resin of this type found particularly suitable in the practice of the present invention is polyvinyl butyral, such for example as that sold under the trade name "Vinylite X."

In carrying out one embodiment of the process of the invention, a layer on one surface of a sheet of the desired base material is first regenerated to polyvinyl alcohol by means of a suitable hydrolyzing agent. In the case of polyvinyl acetals and similar materials a suitable hdyrolyzing agent is a dilute solution of a mineral acid such, for example, as sulphuric acid or hydrochloric acid. In the case of esters, either a base or an acid hydrolyzing agent may be used. The sheet is then subjected to stretching in order to orient the molecules in said polyvinyl alcohol layer, and the stretching is carried out to approximately twice the amount normally required to give a satisfactory dichroic image in the finished sheet when the stretched surface is printed upon with dichroic dye or stain. A layer on the other surface of the sheet is then similarly regenerated to polyvinyl alcohol and the sheet again stretched, but in a direction substantially at right angles to the previous direction of stretch and only to the extent normally required in the case of single sheets.

When the foregoing process is completed, the resulting sheet will be found to have substantially the characteristics indicated in Fig. 1. Central portion 15 of the sheet will still comprise the original material of the sheet, and surface layers 12 and 14 of polyvinyl alcohol will be integral therewith. Each of said surface layers will be molecularly oriented in directions substantially at right angles to each other, and the degree of molecular orientation in each layer will be such that an image formed therein by means of a dichroic dye will show high dichroism and substantially no double image. Furthermore, the sheet will be hard and flat, and will show substantially no tendency to curl or shrink.

Suitable apparatus for use in carrying out the above process is shown diagrammatically in Fig. 2. Plastic sheet or film 20 is passed from supply roll 22 and guided by means of rollers 24 over drum 25 which dips into tank 26 containing hydrolyzing solution 28. Drum 25 is preferably provided with a surface coating of porous material which is adapted to take up solution 28 but will not be affected thereby, and the size and speed of rotation of said drum may be determined and controlled by the time necessary to form a polyvinyl alcohol layer of sufficient thickness upon sheet 20. This time is in turn dependent on the temperature and concentration of hydrogen ions in solution 28.

The extent to which the surface of the sheet is converted will preferably be controlled rather carefully. It appears also that for preferred results the surface should be only partially regenerated. That is to say, some of the surface molecules should be retained in their original condition, and if this condition is brought about, the result will be to insure a more completely integral structure. As an illustrative example of this phase of the invention, it may be assumed that sheet 20 comprises polyvinyl butyral of the type sold under the trade name "Vinylite X," and a suitable thickness for which may be .010 inch. In this case, a suitable hydrolyzing agent is a solution of equal parts of concentrated sulphuric acid and water, and with such a solution a sufficient time of treatment is approximately ten minutes at room temperature.

It should be pointed out that in carrying out this embodiment of the process of the invention, only one surface of the sheet should come in contact with the hydrolyzing solution at a time, and the other surface should be protected therefrom. Apparatus of the type shown in Fig. 2 is accordingly advantageous for the purpose for the reason that it permits this unilateral regeneration or conversion of the sheet without further precautions. It is to be understood, however, that the invention is not limited to apparatus of this type nor to this method of protecting one surface of the sheet during treatment of the other surface. The same result may be achieved, for example, by providing one surface of the sheet with a removable, protective coating resistant to the action of the hydrolyzing agent, in which case the entire sheet may be immersed in the hydrolyzing solution. If such a coating is used, drum 25 in Fig. 2 may be eliminated and the sheet simply guided through solution 28 by means of an idler roll such as those indicated at 30 in tanks 32, 33 and 34. Other ways of accomplishing the same result of unilateral regeneration of the sheet will doubtless be apparent to those skilled in the art and are to be construed as coming within the scope of the invention.

When regeneration of one surface of sheet 20 is completed, the sheet should be thoroughly washed, and convenient apparatus for this purpose is indicated diagrammatically at the right of tank 26 in Fig. 2. Tank 32 represents a tank of water. Tank 33 represents a tank containing an alkaline solution of sufficient strength to neutralize any acid remaining in the sheet, for example a 5% solution of sodium bicarbonate. Tank 34 represents a second tank of water through which the sheet may be passed before reaching take-up roll 35. It will be apparent that if desired there may also be provided suitable drying means such as an oven between tank 34 and roll 35.

When the foregoing steps are completed, sheet 20 will have approximately the characteristics indicated in Fig. 3, except as to molecular orientation. The body 40 of the sheet through to one surface will still comprise polyvinyl butyral, but there will be a surface layer 42 of polyvinyl alcohol integrally formed on the other side thereof.

The molecules in this layer will be in their normal condition of heterogeneous orientation. The next step in this embodiment of the process is to treat the sheet in order to orient the molecules in said layer. A convenient way of carrying out this step is to stretch the sheet at a temperature sufficient to soften it somewhat, for example 120° C. The direction of stretching may be parallel or perpendicular to the edges of the sheet as in the manner indicated by arrows 16 and 18 in Fig. 1. However, if the sheet is to be used in the production of light-polarizing stereoscopic images, it is preferred that the direction of molecular orientation, and hence of stretching, be at an angle of substantially 45° to the edges of the sheet, as indicated by arrow 44 in Fig. 3.

It has already been pointed out that the degree of stretch at this stage of this embodiment of the process of the invention should be substantially twice that usually considered adequate. Under normal conditions in the production of light-polarizing images by printing with a dichroic dye upon molecularly oriented polyvinyl alcohol, it has been found that an adequate degree of molecular orientation is attained if the sheet of polyvinyl alcohol is stretched to approximately twice its original length. In the present example, therefore, the sheet should be stretched to substantially four times its original dimension in the direction of stretch.

The next step of the process is to regenerate to polyvinyl alcohol a layer on the other surface of the sheet, for example by repeating the above described hydrolyzing treatment, and during this treatment the surface of the sheet first treated should be protected as pointed out above from the action of the hydrolyzing agent. The sheet should then again be stretched to orient the molecules in the newly formed layer of polyvinyl alcohol, but the direction of stretch should be substantially at right angles to the previous direction of stretch. The amount of stretch should be only substantially the same as that usually adequate for a sheet upon which it is intended to print only a single image. As pointed out above, adequate orientation for this purpose may be obtained by a stretch to approximately twice the dimension of the sheet. That is to say, if the sheet is first stretched in the direction of its length, it need be stretched the second time only to approximately twice the width which it possessed after completion of the first stretching operation.

As appointed out above, it is preferred that the direction of molecular orientation in the finished sheet be at angles of 45° to the edges of the sheet. Accordingly, in the example shown in Fig. 3, the second stretch should be in a direction substantially at right angles to arrow 44. Although this may result to some extent in disorientation of the molecules in layer 42, they will still retain a degree of orientation adequate for the purposes of the invention, owing to the extra amount of stretch first imparted to the sheet. When this step is completed, the sheet will be approximately as indicated in Fig. 4. Central layer 40 of the sheet will still comprise polyvinyl butyral. On one side of the sheet will be an integrally formed layer 42 of polyvinyl alcohol with its molecules oriented in the direction indicated by arrow 44. On the other side will be a second integrally formed layer 46 of polyvinyl alcohol, with its molecules oriented in a direction substantially at right angles to the direction of molecular orientation in layer 42, as indicated by arrow 45. The sheet will be relatively hard and flat, and under normal conditions of use will retain all the above characteristics indefinitely.

It should be understood that the process described in the foregoing example constitutes only one embodiment of the process of the invention, and that the product of the invention may also be produced in other ways. For example, both surfaces of a sheet of a derivative of polyvinyl alcohol may be simultaneously regenerated to polyvinyl alcohol. This can be done, for example, with the apparatus shown in Fig. 2 by substituting for drum 25 another idler roll positioned in tank 26 in the same manner as idler rolls 30 in tanks 32, 33 and 34. This will result in a product similar to that shown in Fig. 1 but with polyvinyl alcohol surface layers 12 and 14 in their normal state of heterogeneous orientation. The molecules may then be oriented in the desired direction by the application to said surface layers of linear frictional force by means, for example, of a suitable scraper element. Other modifications of the process and product of the invention will doubtless be apparent to one skilled in the art, and they are to be construed as coming within the scope thereof.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An article of manufacture comprising a transparent, unitary sheet, the central portion of said sheet comprising a polyvinyl alcohol derivative chemically transformable to polyvinyl alcohol, an integrally formed layer on each surface of said sheet comprising molecularly oriented polyvinyl alcohol, each said layer and said central portion merging together, the merger comprising copolymer molecules of said derivative and polyvinyl alcohol.

2. An article of manufacture comprising a transparent, unitary sheet, the central portion of said sheet comprising a polyvinyl alcohol derivative chemically transformable to polyvinyl alcohol, an integrally formed layer on each surface of said sheet comprising molecularly oriented polyvinyl alcohol, the directions of molecular orientation in said layers being substantially at right angles to each other, each said layer and said central portion merging together, the merger comprising copolymer molecules of said derivative and polyvinyl alcohol.

3. An article of manufacture comprising a transparent, unitary sheet, the central portion of said sheet comprising a polyvinyl alcohol derivative chemically transformable to polyvinyl alcohol, an integrally formed layer on each surface of said sheet comprising molecularly oriented polyvinyl alcohol, the directions of molecular orientation in said layers being substantially at right angles to each other and at angles of substantially 45° to an edge of said sheet, each said layer and said central portion merging together, the merger comprising copolymer molecules of said derivative and polyvinyl alcohol.

4. An article of manufacture comprising a transparent, unitary sheet, the central portion of said sheet comprising an organic plastic formed of a cyclic ether of polyvinyl alcohol, an integrally formed layer on each surface of said sheet comprising molecularly oriented polyvinyl alcohol, the directions of molecular orientation in said layers being substantially at right angles to each other.

5. An article of manufacture comprising a transparent, unitary sheet, the central portion of said sheet comprising an organic plastic formed of an acetal of polyvinyl alcohol, an integrally formed layer on each surface of said sheet comprising molecularly oriented polyvinyl alcohol, the directions of molecular orientation in said layers being substantially at right angles to each other.

6. An article of manufacture comprising a transparent, unitary sheet, the central portion of said sheet comprising polyvinyl acetal, an integrally formed layer on each surface of said sheet comprising molecularly oriented polyvinyl alcohol, the directions of molecular orientation in said layers being substantially at right angles to each other.

7. The process comprising treating each surface of a sheet of a polyvinyl alcohol derivative transformable by hydrolysis to polyvinyl alcohol with a hydrolyzing agent to convert a layer on each said surface to polyvinyl alcohol without alteration of the central portion of said sheet, predeterminedly orienting the molecules in one of said layers, and orienting the molecules in the other of said layers in a direction substantially at right angles to the direction of molecular orientation in said first named layer.

8. The process comprising treating one surface of a sheet of a polyvinyl alcohol derivative transformable by hydrolysis to polyvinyl alcohol with a hydrolyzing agent to convert to polyvinyl alcohol a layer on said surface, predeterminedly orienting the molecules in said layer, then similarly converting to polyvinyl alcohol a layer on the other surface of said sheet, and orienting the molecules in said second named layer in a direction substantially at right angles to the direction of molecular orientation in said first named layer.

9. The process comprising treating one surface of a sheet of a polyvinyl alcohol derivative transformable by hydrolysis to polyvinyl alcohol with a hydrolyzing agent to convert to polyvinyl alcohol a layer on said surface, stretching said sheet to orient the molecules in said layer, then similarly converting to polyvinyl alcohol a layer on the other surface of said sheet, and stretching said sheet to a lesser extent in a direction substantially at right angles to said first direction of stretch to orient the molecules in said second formed layer in a direction substantially at right angles to the direction of molecular orientation in said first named layer.

10. The process comprising treating one surface of a sheet of a polyvinyl alcohol derivative transformable by hydrolysis to polyvinyl alcohol with a hydrolyzing agent to convert to polyvinyl alcohol a layer on said surface, orienting the molecules in said layer by stretching said sheet to a predetermined degree, then similarly converting to polyvinyl alcohol a layer on the other surface of said sheet, and orienting the molecules in said second named layer in a direction substantially at right angles to the direction of molecular orientation in said first named layer by stretching said sheet in a direction substantially at right angles to the direction of said first named stretching to a degree approximately one-half that of said first named stretch.

11. The process comprising treating one surface of a sheet of a transparent polyvinyl alcohol derivative transformable by hydrolysis to polyvinyl alcohol with a hydrolyzing agent to convert a layer thereon to polyvinyl alcohol while protecting the other surface of said sheet from the action of said hydrolyzing agent, stretching said sheet to a predetermined degree to orient the molecules in said polyvinyl alcohol layer, then treating the other surface of said sheet with a hydrolyzing agent to convert a layer thereon to polyvinyl alcohol while protecting said first named surface from the action of said hydrolyzing agent, and stretching said sheet to a lesser degree in a direction substantially at right angles to said first direction of stretch to orient the molecules in said second formed polyvinyl alcohol layer in a direcion substantially at right angles to the direction of molecular orientation in said first named polyvinyl alcohol layer.

12. The process comprising treating one surface of a sheet of polyvinyl acetal with a solution of a mineral acid to regenerate a layer on said surface to polyvinyl alcohol, stretching said sheet to a predetermined degree to orient the molecules in said polyvinyl alcohol layer, then treating the other surface of said sheet with a mineral acid solution to regenerate a layer thereon to polyvinyl alcohol, and stretching said sheet in a direction substantially at right angles to the direction of said first named stretching to a degree approximately one-half that of said first named stretching to orient the molecules in said second formed layer in a direction substantially at right angles to the direction of molecular orientation in said first named layer.

13. The process comprising treating one surface of a sheet of polyvinyl acetal with a solution of a mineral acid to regenerate a layer on said surface to polyvinyl alcohol, treating said surface with an alkaline solution adapted to neutralize such of said acid solution as may remain therein, stretching said sheet to a predetermined degree to orient the molecules in said polyvinyl alcohol layer, then treating the other surface of said sheet with a mineral acid solution to regenerate a layer thereon to polyvinyl alcohol, treating said second surface with an alkaline solution to neutralize such of said acid solution as may remain therein, and stretching said sheet in a direction substantially at right angles to the direction of said first named stretching to a degree approximately one-half that of said first named stretching to orient the molecules in said second formed layer in a direction substantially at right angles to the direction of molecular orientation in said first named layer.

14. An article of manufacture comprising a transparent, unitary sheet, the central portion of said sheet comprising a polyvinyl alcohol derivative chemically transformable to polyvinyl alcohol, an integrally formed layer on each surface of said sheet comprising molecularly oriented polyvinyl alcohol, the directions of molecular orientation in said layers being substantially at right angles to each other, each of said surface layers having dichroic material incorporated therein, each said layer and said central portion merging together, the merger comprising copolymer molecules of said derivative and polyvinyl alcohol.

15. An article of manufacture comprising a transparent, unitary sheet, the central portion of said sheet comprising a polyvinyl alcohol derivative chemically transformable to polyvinyl alcohol, an integrally formed layer on each surface of said sheet comprising molecularly oriented polyvinyl alcohol, the directions of molecular orientation in said layers being substantially at right angles to each other, predetermined areas of each of said surface layers having dichroic material incorporated therein, the dichroic areas in each of said layers forming in combination a predetermined image each said layer and said central portion merging together, the merger comprising copolymer molecules of said derivative and polyvinyl alcohol.

16. An article of manufacture comprising a transparent, unitary sheet, the central portion of said sheet comprising a polyvinyl alcohol derivative chemically transformable to polyvinyl alcohol, an integrally formed layer on each surface of said sheet comprising molecularly oriented polyvinyl alcohol, the directions of molecular orientation in said layers being substantially at right angles to each other, predetermined areas of each of said surface layers having dichroic material incorporated therein, the dichroic areas in each of said layers forming in combination a predetermined image, said images being respectively left-eye and right-eye images of a predetermined stereoscopic pair each said layer and said central portion merging together, the merger comprising copolymer molecules of said derivative and polyvinyl alcohol.

17. An article of manufacture comprising a transparent, unitary sheet, the central portion of said sheet comprising a polyvinyl alcohol derivative chemically transformable to polyvinyl alcohol, an integrally formed layer on each surface of said sheet comprising molecularly oriented polyvinyl alcohol, the directions of molecular orientation in said layers being substantially at right angles to each other and at angles of substantially 45° to an edge of said sheet, predetermined areas of each of said surface layers having dichroic material incorporated therein, the dichroic areas in each of said layers forming in combination a predetermined image, said images being respectively left-eye and right-eye images of a predetermined stereoscopic pair each said layer and said central portion merging together, the merger comprising copolymer molecules of said derivative and polyvinyl alcohol.

18. An article of manufacture comprising a transparent, unitary sheet, the central portion of said sheet comprising polyvinyl acetal, an integrally formed layer on each surface of said sheet comprising molecularly oriented polyvinyl alcohol, the directions of molecular orientation in said layers being substantially at right angles to each other, predetermined areas of each of said surface layers having dichroic material incorporated therein, the dichroic areas in each of said layers forming in combination a predetermined image, said images being respectively left-eye and right-eye images of a predetermined stereoscopic pair.

19. An article of manufacture comprising a transparent, unitary sheet, the central portion of said sheet comprising an organic plastic formed of an ester of polyvinyl alcohol, an integrally formed layer on each surface of said sheet comprising molecularly oriented polyvinyl alcohol, the directions of molecular orientation in said layers being substantially at right angles to each other.

20. An article of manufacture comprising a transparent, unitary sheet, the central portion of said sheet comprising an organic plastic formed of a ketal of polyvinyl alcohol, an integrally formed layer on each surface of said sheet comprising molecularly oriented polyvinyl alcohol, the directions of molecular orientation in said layers being substantially at right angles to each other.

21. An article of manufacture comprising a transparent, unitary sheet, the central portion of said sheet comprising a polyvinyl acetal, an integrally formed layer on each surface of said sheet comprising molecularly oriented polyvinyl alcohol, the directions of molecular orientation in said layers being substantially at right angles to each other, predetermined areas of each of said surface layers having dichroic material incorporated therein, the dichroic areas in each of said layers forming in combination a predetermined image, said images being respectively left-eye and right-eye images of a predetermined stereoscopic pair.

22. An article of manufacture comprising a transparent, unitary sheet, the central portion of said sheet comprising a polyvinyl ketal, an integrally formed layer on each surface of said sheet comprising molecularly oriented polyvinyl alcohol, the directions of molecular orientation in said layers being substantially at right angles to each other, predetermined areas of each of said surface layers having dichroic material incorporated therein, the dichroic areas in each of said layers forming in combination a predetermined image, said images being respectively left-eye and right-eye images of a predetermined stereoscopic pair.

23. An article of manufacture comprising a transparent, unitary sheet, the central portion of said sheet comprising a polyvinyl ester, an integrally formed layer on each surface of said sheet comprising molecularly oriented polyvinyl alcohol, the directions of molecular orientation in said layers being substantially at right angles to each other, predetermined areas of each of said surface layers having dichroic material incorporated therein, the dichroic areas in each of said layers forming in combination a predetermined image, said images being respectively left-eye and right-eye images of a predetermined stereoscopic pair.

24. An article of manufacture comprising a transparent, unitary sheet, the central portion of said sheet comprising a polyvinyl cyclic ether, an integrally formed layer on each surface of said sheet comprising molecularly oriented polyvinyl alcohol, the directions of molecular orientation in said layers being substantially at right angles to each other, predetermined areas of each of said surface layers having dichroic material incorporated therein, the dichroic areas in each of said layers forming in combination a predetermined image, said images being respectively left-eye and right-eye images of a predetermined stereoscopic pair.

25. The process comprising treating each surface of a sheet of a polyvinyl acetal with a hydrolyzing agent to convert a layer on each said surface to polyvinyl alcohol without alteration of the central portion of said sheet, predeterminedly orienting the molecules in one of said layers, and orienting the molecules in the other of said layers in a direction substantially at right angles to the direction of molecular orientation in said first named layer.

26. The process comprising treating each surface of a sheet of a polyvinyl ketal with a hydrolyzing agent to convert a layer on each said surface to polyvinyl alcohol without alteration of the central portion of said sheet, predeterminedly orienting the molecules in one of said layers, and orienting the molecules in the other of said layers in a direction substantially at right angles to the direction of molecular orientation in said first named layer.

27. The process comprising treating each surface of a sheet of a polyvinyl ester with a hydrolyzing agent to convert a layer on each said surface to polyvinyl alcohol without alteration of the central portion of said sheet, predeterminedly orienting the molecules in one of said layers, and orienting the molecules in the other of said layers in a direction substantially at right angles to the direction of molecular orientation in said first named layer.

28. The process comprising treating each surface of a sheet of a polyvinyl cyclic ether with a hydrolyzing agent to convert a layer on each said surface to polyvinyl alcohol without alteration of the central portion of said sheet, predeterminedly orienting the molecules in one of said layers, and orienting the molecules in the other of said layers in a direction substantially at right angles to the direction of molecular orientation in said first named layer.

EDWIN H. LAND.